United States Patent
Liu et al.

(10) Patent No.: US 8,919,144 B2
(45) Date of Patent: Dec. 30, 2014

(54) HEAT PUMP FOR HEAT SOURCE POWER RECOVERING SECONDARY SOLAR FOR SUBTROPICAL CLIMATES

(76) Inventors: Qiuke Liu, Changsha (CN); Zhiqi Liu, Changsha (CN); Zhiyao Liu, Changsha (CN)

( * ) Notice: Subject to any disclaimer, the term of this patent is extended or adjusted under 35 U.S.C. 154(b) by 371 days.

(21) Appl. No.: 13/444,877

(22) Filed: Apr. 12, 2012

(65) Prior Publication Data

US 2012/0198877 A1    Aug. 9, 2012

Related U.S. Application Data

(63) Continuation-in-part of application No. PCT/CN2010/076869, filed on Sep. 14, 2010.

(30) Foreign Application Priority Data

Oct. 12, 2009    (CN) .......................... 2009 1 0308216

(51) Int. Cl.
  *F25D 21/00*    (2006.01)
  *F25B 30/06*    (2006.01)
  *F25B 27/00*    (2006.01)
  *F28C 1/16*    (2006.01)

(52) U.S. Cl.
  CPC ............... *F25B 30/06* (2013.01); *F25B 27/005* (2013.01); *F28C 1/16* (2013.01)
  USPC ........................................................ 62/259.4

(58) Field of Classification Search
  CPC ........ F25B 30/02; F25B 30/06; F25B 27/002; F25B 27/005; F24F 2005/0064; F24F 2005/0046; F28C 1/14; F28C 1/16
  USPC ............ 62/235.1, 238.1, 238.6, 238.7, 259.4, 62/470, 478, 498, 324.1, 324.5
  See application file for complete search history.

(56) References Cited

U.S. PATENT DOCUMENTS

| | | | |
|---|---|---|---|
| 4,443,389 A * | 4/1984 | Dodds ........................... | 261/153 |
| 5,596,067 A * | 1/1997 | Komiya et al. ............... | 528/196 |
| 6,581,849 B2 * | 6/2003 | Zhang ............................. | 239/63 |
| 6,766,655 B1 * | 7/2004 | Wu ................................. | 62/305 |
| 2006/0117783 A1 * | 6/2006 | Solomon ...................... | 62/324.1 |

* cited by examiner

*Primary Examiner* — Cheryl J Tyler
*Assistant Examiner* — Gordon Jones
(74) *Attorney, Agent, or Firm* — Wayne & King LLC

(57) ABSTRACT

A tower heat pump system equipped with a solar energy secondary heat source comprises a cold-heat source tower, a low heat source rotational flow heat pump, a condensate water separator, a supplementary device and a rear end loading system. The tower heating pump system can achieves negative pressure evaporation, cooling and refrigeration in a high-temperature high-humidity condition and efficiently absorb and improve low-temperature-level heat energy from the solar energy secondary heat source in a low-temperature low-humidity condition.

6 Claims, 4 Drawing Sheets

HEAT PUMP FOR HEAT SOURCE POWER RECOVERING SECONDARY SOLAR FOR SUBTROPICAL CLIMATES

CROSS-REFERENCE TO RELATED APPLICATIONS

This application is a continuation-in-part of International Patent Application No. PCT/CN2010/076869 with an international filing date of Sep. 14, 2010, designating the United States, now pending, and further claims priority benefits to Chinese Patent Application No. 200910308216.3 filed Oct. 12, 2009. The contents of all of the aforementioned applications, including any intervening amendments thereto, are incorporated herein by reference.

CORRESPONDENCE ADDRESS

Inquiries from the public to applicants or assignees concerning this document should be directed to: WAYNE & KING LLC, ATTN DR. XIA LI. P.O. BOX 439 PAINTED POST, NY 14870

BACKGROUND OF THE INVENTION

1. Field of the Invention

The invention relates to a heat pump for a heat source tower using secondary solar energy which is used in regions with a high temperature and high humid of summer and a low temperature and high humid of winter, for example, regions with a subtropics monsoon climate, temperate zone oceanic climate, and Mediterranean type of climate.

2. Description of the Related Art

The heat transfer technology of a traditional air source heat pump follows the theory of the large temperature difference, so the frost frequency is very high because of the low evaporation temperature in the winter. Thus, the heat pump cannot supply heat normally since it is frosted and thus needs electric auxiliary heat with high-power to supply heat directly, resulting in a high energy consumption. At the same time, the latent heat which belongs to a renewable energy source cannot be used, and on the contrary, it is harmful to an air-cooled heat pump.

Because of the difference between the mountain construct and the imbalance of the climatic weather, a ground source heat pump in the prior art has disadvantages such as high initial cost, low rate of return (only about 30 days' energy saving during a whole year), and low indicators of the comprehensive economic performance.

SUMMARY OF THE INVENTION

In view of the above-described problems, it is one objective of the invention to provide a heat pump for a heat source tower using secondary solar energy which can absorb the cold (heat) source in the air and improve indicators of the comprehensive economic performance in a hot and humid summer and in a low temperature and humid winter.

To achieve the above objective, in accordance with one embodiment of the invention, there is provided a heat pump for a heat source tower using secondary solar energy, comprising a cold and heat source tower, a low heat source heat pump, a condensation water separate device used in winter, a looping system at a cold and heat source side, and a circulating system at a terminal load side.

The cold and heat source tower comprises a heat exchange fan, a steam fog separator, a steam fog separate layer, a spray/frost prevention component, a tower maintenance structure, a vertical finned heat exchanger, a vertical air inlet grid deflector, a water-containing plate, and a solution adjusting tank. The heat exchange fan is fixed on the top of a support frame. The steam fog separator is arranged above the heat exchange fan, and the steam fog separate layer is arranged below the heat exchange fan. The spray/frost prevention component is arranged below the steam fog separate layer. The vertical finned heat exchanger is arranged below the spray/frost prevention component and at an inner perimeter of the tower maintenance structure. The vertical air inlet grid deflector is arranged below the spray/frost prevention component at an outer perimeter of the tower maintenance structure. The water-containing plate is arranged below the vertical finned heat exchanger. The solution adjusting tank is arranged below the water-containing plate.

The low heat source heat pump comprises a low heat source heat pump compressor, a small temperature difference condenser, a broadband expansion valve, and a small temperature difference evaporator. An outlet of the low heat source heat pump compressor is connected with an inlet of the small temperature difference condenser via a pipeline. A liquid outlet of the small temperature difference condenser is connected with an inlet of the broadband expansion valve via a pipeline. An outlet of the broadband expansion valve is connected with an inlet of the small temperature difference evaporator via a pipeline. An outlet of the small temperature difference evaporator is connected with a suction inlet of the low heat source heat pump compressor.

The condensation water separate device used in winter comprises a condensate separator comprising a condensed water film separator and a heat pump heater. A liquid inlet of the condensate separator is connected with an outlet of the solution adjusting tank of the cold and heat source tower through a pipeline and a control valve. A liquid outlet of the condensate separator is connected with the spray/frost prevention component of the cold and heat source tower through a pipeline with a control valve.

The looping system at the cold and heat source side comprises an expansion fluid infusion device, a cold and heat source pump, a first four way reversing valve, and a second four way reversing valve. An inlet of the expansion fluid infusion device and an outlet of the vertical finned heat exchanger of the cold and heat source are connected together through a pipeline. An outlet of the expansion fluid infusion device is connected with the cold and heat source pump through a pipeline. The cold and heat source pump is connected with an inlet of the first four way reversing valve through a pipeline. An outlet of the first four way reversing valve is connected with an inlet of the small temperature difference evaporator at a medium side through a pipeline. Another inlet of the first four way reversing valve and a load pump is connected together through a pipeline. An inlet of the second four way reversing valve is connected with a second outlet of the small temperature difference evaporator at the medium side through a pipeline. The second four way reversing valve is connected with an inlet of the vertical finned heat exchanger of the cold and heat source tower through a pipeline.

The circulating system at the terminal load side comprises a terminal heat exchanger, and the first and second four way reversing valve of the looping system at the cold and heat source side. An inlet of the circulating system at the terminal load side is connected with an inlet of the terminal heat exchanger through a pipeline. An outlet of the terminal heat exchanger is connected with a water outlet. The water outlet is connected with the load pump via a pipeline and valve. The load pump is connected with the first four way reversing valve via a pipeline and a valve. The first four way reversing valve is connected with a water inlet of the small temperature difference condenser of the low heat source heat pump through a pipeline. A water outlet of the small temperature difference condenser is connected with the second four way reversing valve via a pipeline and a valve. The second four way reversing valve is connected with the inlet of the circulating system at the terminal load side via a pipeline.

Compared to conventional heat pump systems, the heat pump for a heat source tower of the invention can save energy by 10-20%, which is equivalent to increasing environment's temperature by about 10° C. in winter. In summer, compared to conventional refrigerators, it is equivalent to decreasing environment's temperature by about 6-8° C., thereby improving the performance of the refrigerators or heat pumps. The heat pump can save heating system, cooling system, and hot water supplying. This technology benefits zero carbon emission in the areas of subtropical monsoon climate, temperate oceanic climate, Mediterranean climate and other similar climates. The comprehensive economic performance indicators of this technology are higher than the traditional central air conditioning system by 25-50% in the similar climatic conditions.

If the heat pump for a heat source tower is applied up to about 50%, carbon emission from fossil fuel on the earth will decrease at the least 200 billion ton each year, which is equivalent to increasing the forest area by 1.4 square kilometers.

DETAILED DESCRIPTION OF THE EMBODIMENTS

Figure 1:
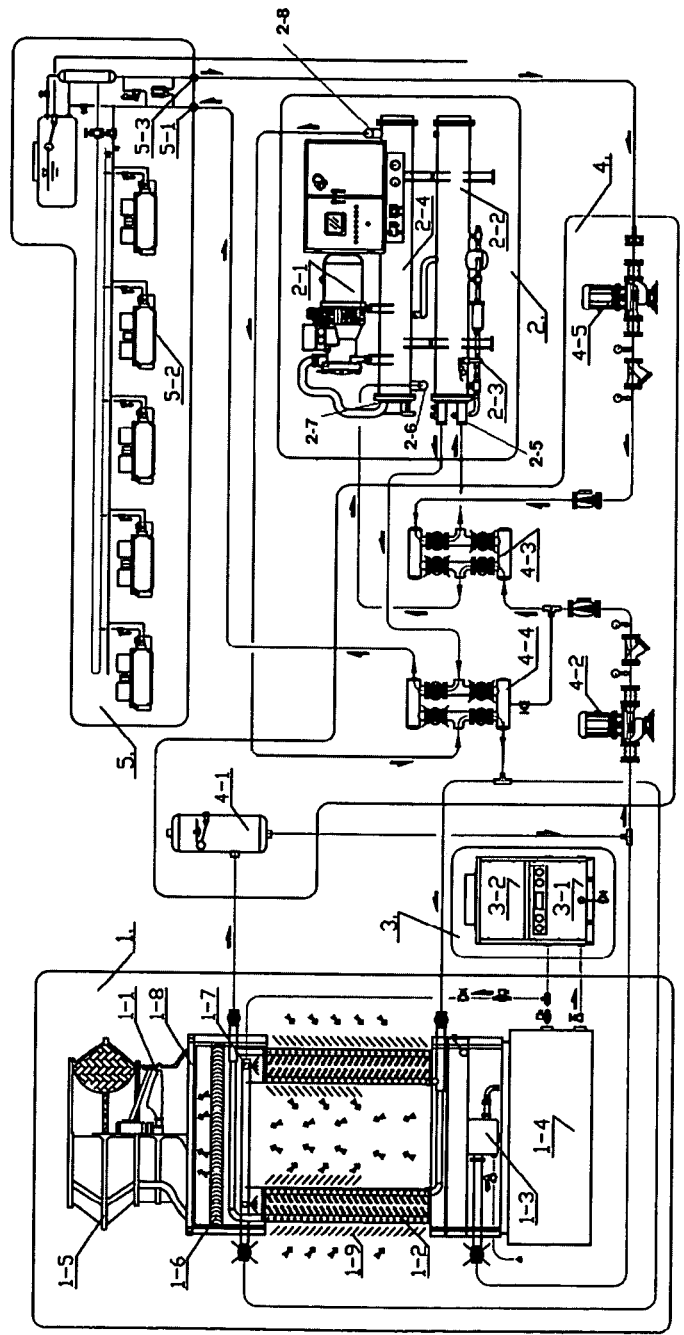
FIG. 1 is an overall schematic diagram of a heat pump for a heat source tower according to one embodiment of the invention.

As shown in FIG. 1, a heat pump for a heat source tower comprises a cold and heat source tower 1, a low heat source heat pump 2, a condensation water separate device used in winter 3, a looping system at a cold and heat source side 4, and a circulating system at a terminal load side 5.

The cold and heat source tower 1 comprises a heat exchange fan 1-1, a steam fog separator 1-5, a steam fog separate layer 1-6, a spray/frost prevention component 1-7, a tower maintenance structure, a vertical finned heat exchanger 1-2, a vertical air inlet grid deflector 1-9, a water-containing plate 1-3, and a solution adjusting tank 1-4. The heat exchange fan 1-1 is fixed on the top of a support frame 1-8. The steam fog separator 1-5 is arranged above the heat exchange fan 1-1 and the steam fog separate layer 1-6 is arranged below the heat exchange fan 1-1. The spray/frost prevention component 1-7 is arranged below the steam fog separate layer 1-6. The vertical finned heat exchanger 1-2 is arranged below the spray/frost prevention component 1-7 and at an inner perimeter of the tower maintenance structure. The vertical air inlet grid deflector 1-9 is arranged below the spray/frost prevention component 1-7 and at an outer perimeter of the tower maintenance structure. The water-containing plate 1-3 is arranged below the vertical finned heat exchanger 1-2. The solution adjusting tank 1-4 is arranged below the water-containing plate 1-3.

The low heat source heat pump 2 comprises a low heat source heat pump compressor 2-1, a small temperature difference condenser 2-2, a broadband expansion valve 2-3, and a small temperature difference evaporator 2-4. An outlet of the low heat source heat pump compressor is connected with an inlet of the small temperature difference condenser via a pipeline. A liquid outlet of the small temperature difference condenser is connected with an inlet of the broadband expansion valve via a pipeline. An outlet of the broadband expansion valve is connected with an inlet of the small temperature difference evaporator via a pipeline. An outlet 2-7 of the small temperature difference evaporator is connected with a suction inlet of the low heat source heat pump compressor.

The condensation water separate device used in winter 3 comprises a condensate separator comprising a condensed water film separator 3-1 and a heat pump heater 3-2. A liquid inlet of the condensate separator is connected with an outlet of the solution adjusting tank 1-4 of the cold and heat source tower 1 through a pipeline and a control valve. A liquid outlet of the condensate separator is connected with the spray/frost prevention component 1-7 of the cold and heat source tower 1 through a pipeline with a control valve.

The looping system at the cold and heat source side 4 comprises an expansion fluid infusion device 4-1, a cold and heat source pump 4-2, a first four way reversing valve 4-3, and a second four way reversing valve 4-4. An inlet of the expansion fluid infusion device 4-1 and an outlet of the vertical finned heat exchanger 1-2 of the cold and heat source 1 are connected together through a pipeline. An outlet of the expansion fluid infusion device is connected with the cold and heat source pump through a pipeline. The cold and heat source pump 4-2 is connected with an inlet of the first four way reversing valve 4-3 through a pipeline. An outlet of the first four way reversing valve is connected with an inlet 2-6 of the small temperature difference evaporator 2-4 at a medium side through a pipeline. Another inlet of the first four way reversing valve 4-3 and a load pump 4-5 is connected together through a pipeline. An inlet of the second four way reversing valve is connected with a second outlet 2-8 of the small temperature difference evaporator at the medium side through a pipeline. The second four way reversing valve 4-4 is connected with an inlet of the vertical finned heat exchanger 1-2 of the cold and heat source tower 1 through a pipeline.

The circulating system at the terminal load side 5 comprises a terminal heat exchanger 5-2, and the first and second four way reversing valve of the looping system at the cold and heat source side 4. An inlet 5-1 of the circulating system at the terminal load side 5 is connected with an inlet of the terminal heat exchanger 5-2 through a pipeline. An outlet of the terminal heat exchanger is connected with a water outlet 5-3. The water outlet 5-3 is connected with the load pump 4-5 via a pipeline and valve. The load pump 4-5 is connected with the first four way reversing valve 4-3 via a pipeline and a valve. The first four way reversing valve 4-3 is connected with a water inlet 2-5 of the small temperature difference condenser 2-2 of the low heat source heat pump through a pipeline. A water outlet of the small temperature difference condenser 2-2 is connected with the second four way reversing valve 4-4 via a pipeline and a valve. The second four way reversing valve 4-4 is connected with the inlet 5-1 of the circulating system at the terminal load side 5 via a pipeline.

Figure 2:
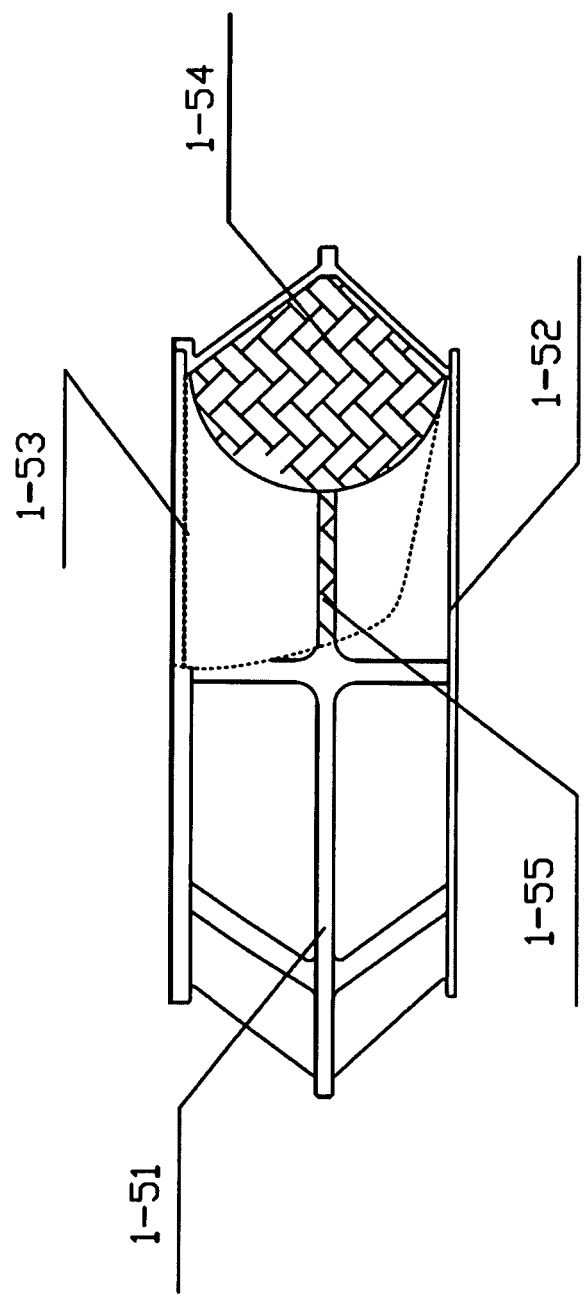
FIG. 2 is an enlarged view of a steam fog separator of a cold and heat source tower according to one embodiment of FIG. 1.

As shown in FIG. 2, the steam fog separator 1-5 of the cold and heat source tower 1 comprises a diamond-shaped shell 1-51, a hydrophilic defog layer 1-54, and a diversion baffle 1-55. The diversion baffle 1-55 is installed in the center of the diamond-shaped shell 1-51. The hydrophilic defog layer 1-54 is installed in a diamond-shaped region of the diamond-shaped shell 1-51. The steam fog separator 1-5 comprises an air inlet 1-52 on the bottom and an air outlet 1-53 on the top.

Figure 3:
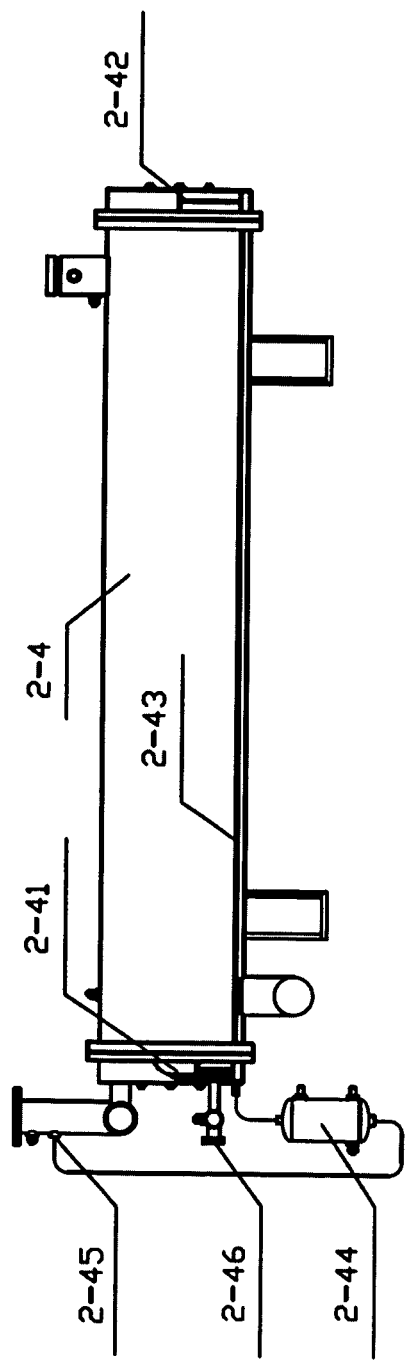
FIG. 3 is an enlarged view of a small temperature difference evaporator of a low heat source heat pump according to one embodiment of FIG. 1.

As shown in FIG. 3, the small temperature difference evaporator 2-4 of the low heat source heat pump 2 comprises a small temperature difference evaporator body with an working fluid inlet 2-46, a front end cover oil chamber 2-41, a back end cover oil chamber 2-42, an oil evaporation tube 2-43, an oil heater 2-44, and a negative pressure return oil pipes 2-45. The front end cover oil chamber 2-41 and the back end cover oil chamber 2-42 are installed in the front and back end parts of the small temperature difference evaporator body, respectively. The oil evaporation tube 2-43 is installed at the inner bottom of the small temperature difference evaporator body. An oil inlet of the oil heater 2-44 is connected with the oil evaporation tube 2-43, which connects directly with the front end cover oil chamber 2-41 and the back end cover oil chamber 2-42. An oil outlet of the oil heater 2-44 is connected with the negative pressure return oil pipes 2-45 via a pipeline. The oil heater 2-44 is further provided with two heavy oil heating interfaces.

Figure 4:
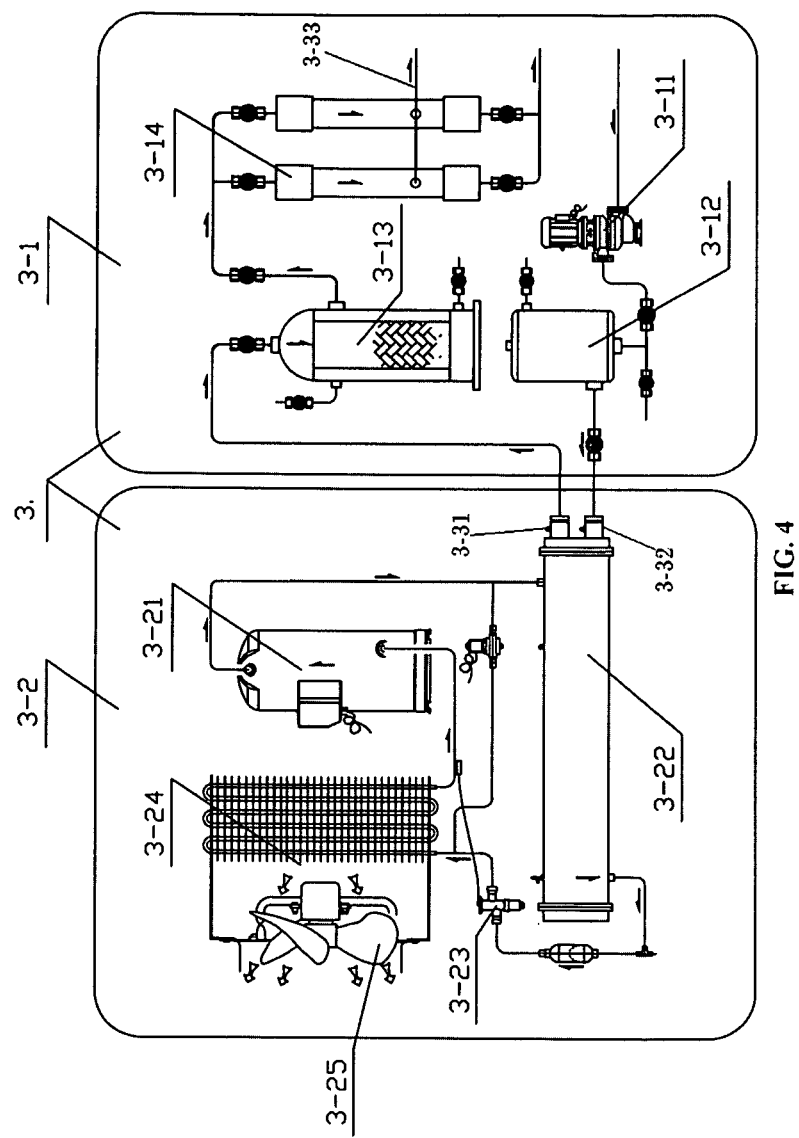
FIG. 4 is an enlarged view of a condensate separator according to one embodiment of FIG. 1.

As shown in FIG. 4, the condensate water separate device used in winter 3 comprises the condensed water film separator 3-1 and the heat pump heater 3-2. The heat pump heater 3-2 comprises a heat source fan 3-25. The heat source fan 3-25 and an air source evaporator 3-24 are assembled in a cavity. A steam outlet of the air source evaporator 3-24 connects with a compressor 3-21 via a pipeline. The compressor 3-21 connects with the small temperature difference heat transfer condenser 3-22, which connects with the inlet of an expansion valve 3-23. An outlet of the expansion valve 3-23 connects with an air source evaporator 3-24. A cycle solution outlet 3-31 of the small temperature difference heat transfer condenser 3-22 connects with a multi-media filter 3-13 of the condensed water film separator 3-1. An outlet of the small temperature difference heat transfer condenser 3-22 connects with a separator filter 3-12 of the condensed water film separator 3-1. A solution pressure pump of the condensed water film separator 3-1 connects with an inlet of the separator filter 3-12. An outlet of the separator filter 3-12 connects with a water inlet 3-32 of the small temperature difference heat transfer condenser 3-22 which connects with an inlet of a multiple media filter 3-13. An outlet of the multiple media filter 3-13 connects with an inlet of a molecular film processor 3-14 which is provided with a central drain 3-33. A strong solution outlet of the molecular film processor 3-14 connects with the spray/frost prevention component.

The working principles of the invention comprise, depending on heating condition, a working principle of the looping system at the cold and heat source side, a working principle of the circulating system at the terminal load side, and a working principle of the condensation water separate device used in winter.

(1) The working principle of the looping system at the cold and heat source side: The heat exchange fan 1-1 of the cold and heat source tower 1 is launched to stir ambient air. The vertical finned heat exchanger 1-2 absorbs low level heat energy from the air to pass to the circulating medium within the vertical finned heat exchanger 1-2. Thus, the temperature and enthalpy of the circulating medium increase. The circulating medium enters a suction of the cold and heat source pump 4-2 from the vertical finned heat exchanger 1-2. After the pressure is enhanced by the cold and heat source pump 4-2, the circulating medium enters the first four-way reversing valve 4-3 through pipe equipped with filters and check valves. Therefore, the commutation of the high enthalpy value circulating medium is completed. And then the medium enters the small temperature difference evaporator 2-4 of the low heat source heat pump 2 from a liquid outlet of the first four-way reversing valve 4-3. The circulating medium with high enthalpy value completes heat transfer in the small temperature difference evaporator 2-4. The circulating medium temperature and enthalpy decrease after low grade heat is transferred to a cold refrigerant, then enters the second four-way reversing valve 4-4 through a pipe to complete the commutation. Finally, the circulating medium enters the vertical finned heat exchanger 1-2 to absorb low level heat energy from the air, the cycle of absorbing low-temperature heat source at the cold and heat source side is completed.

(2) The working principle of the circulating system at the terminal load side: circulating hot water temperature drops after releasing heat by the terminal heat exchanger 5-2, and hot water becomes low-enthalpy hot water to enter the load pump from the outlet of load side. After the terminal load pump 4-5 enhances the pressure, hot water enters the first four-way reversing valve 4-3 to complete the low-enthalpy hot water commutation through the pipe with a filter and check valve, then enters small temperature difference condenser 2-2 to cool the shell side refrigerant vapor, the water becomes high-enthalpy hot water, at last, the high-enthalpy hot water through a pipe into the second four-way reversing valve 4-4 to complete the high-enthalpy hot water commutation.

(3) The working principle of the condensation water separate device used in winter; when the ambient air temperature is below zero, the surface of the vertical finned heat exchanger becomes frosty during the cold, and the heat source tower absorbs latent low temperature heat energy in the air. When the frost thickness reaches a certain value, the efficiency of heat transfer will be affected, and subsequently an anti-frost solution is sprayed by the spray/frost prevention component 1-7 to reduce the surface freezing point of the vertical finned heat exchanger 1-2. The anti-frost solution is diluted and enters the water-containing plate 1-3, then is inhaled to the solution adjusting tank 1-4 from the inlet port of the condensation water separate device 3. After isolating from condensation of water, the anti-frost solution becomes a concentrated solution and enters the spray/frost prevention component 1-7. Thus, the whole spray anti-frost concentrated cycle is completed.

When ambient air temperature detected by the condensation water separate device 3 is below zero, a condensate drain valve of the water-containing plate 1-3 is turned off automatically and the condensation water separate device is started.

When ambient air temperature detected by the condensation water separate device 3 is above zero, a condensate drain valve of the water-containing plate 1-3 is turned on automatically and the condensation water separate device is turned off.

To prevent the negative temperature frost in the process of heat exchange between the cold and heat source tower 1 and ambient air, it is necessary to spray the anti-frost solution intermittently and use a hydrophilic mist eliminator to prevent fogging drift; rotating airflow in the cold and heat source tower 1 is received via the air inlet 1-52 of the steam fog separator 1-5. The diversion baffle 1-55 influences the air flow deviate to the hydrophilic defog layer 1-54, and thus fog is removed and gas is injected through the air outlet 1-53.

The working principle of the small temperature difference evaporator 2-4 of the low heat source heat pump 2: a gas-liquid mixture fluid comes from the broadband expansion valve 2-3, enters the small temperature difference evaporator 2-4 to absorb heat through the inlet port 2-46. When the evaporation temperature is below zero, the system refrigerant separates from lubricating oil and deposits. The lubricating oil and refrigerant mixture passes through the front end cover oil chamber 2-41 and back end cover oil chamber 2-42, to enter the oil evaporation tube 2-43 to evaporate and separate the refrigerant. The remaining lubricating oil enters the oil heater 2-44 for heating, and then is pumped into the low heat source heat pump 2-1 through negative pressure return oil pipes 2-45. Thus, the low-temperature oil cycle is completed.

The working principle of the condensed water film separator 3-1 and the heat pump heater 3-2 are summarized below.

The working principle of the condensed water film separator 3-1 is as follows: a dilute solution pressurized by a booster pump 3-11 enters the separator filter 3-12 to filter out impurities, and then goes to the small temperature difference heat transfer condenser 3-22 at the medium side. The heated solution enters the multi-media filter 3-13, and after tiny impurities removed, the heated solution enters the molecular film processor 3-14 to separate condensed water (moisture in the air), which is then discharged by the outlet in the middle of the molecular film processor 3-14. The concentrated solution located by the liquid outlet in the bottom communicates into the spray/frost prevention component.

The working principle of the heat pump heater 3-2 is as follows: when the ambient air temperature detected by the condensation water separate device is below zero, the heat pump heater 3-2 starts automatically, and the heat exchange fan of the air source evaporator 3-24 stirs ambient air to make the low level heat energy from ambient air transfer to the refrigerant in the air source evaporator 3-24. The refrigerant becomes low-pressure saturated vapor, enters the compressor 3-21, and is enhanced to be high-pressure, high-temperature gas. The gas enters the small temperature difference heat transfer condenser 3-22 to release heat to the circulating medium, of the tube side. Thus, the circulating medium heating process is completed. High-pressure high-temperature gas is condensed to be high-pressure saturated liquid refrigerant and flows into the expansion valve 3-23 through the tubing and the filter to complete the process of throttling expansion, and then returns to the air source evaporator 3-24 to absorb the low level heat energy in the air. Thus, a work cycle is completed.

The invention claimed is:

1. A heat pump in combination with a heat source tower, comprising:
   a) a cold and heat source tower;
   b) a low heat source heat pump;
   c) a condensation water separate device used in winter;
   d) a looping system at a cold and heat source side; and
   e) a circulating system at a terminal load side; wherein
   the cold and heat source tower comprises a heat exchange fan, a steam fog separator, a steam fog separate layer, a spray/frost prevention component, a tower maintenance structure, a vertical finned heat exchanger, a vertical air inlet grid deflector, a water-containing plate, and a solution adjusting tank; the heat exchange fan is fixed on the top of a support frame; the steam fog separator is arranged above the heat exchange fan and the steam fog separate layer is arranged below the heat exchange fan; the spray/frost prevention component is arranged below the steam fog separate layer; the vertical finned heat exchanger is arranged below the spray/frost prevention component and at an inner perimeter of the tower maintenance structure; the vertical air inlet grid deflector is arranged below the spray/frost prevention component and at an outer perimeter of the tower maintenance structure; the water-containing plate is arranged below the vertical finned heat exchanger; the solution adjusting tank is arranged below the water-containing plate;

the low heat source heat pump comprises a low heat source heat pump compressor, a small temperature difference condenser, a broadband expansion valve, and a small temperature difference evaporator; an outlet of the low heat source heat pump compressor is connected with an inlet of the small temperature difference condenser via a pipeline; a liquid outlet of the small temperature difference condenser is connected with an inlet of the broadband expansion valve via a pipeline; an outlet of the broadband expansion valve is connected with an inlet of the small temperature difference evaporator via a pipeline; an outlet of the small temperature difference evaporator is connected with a suction inlet of the low heat source heat pump compressor;

the condensation water separate device used in winter comprises a condensate separator comprising a condensed water film separator and a heat pump heater; a liquid inlet of the condensate separator is connected with an outlet of the solution adjusting tank of the cold and heat source tower through a pipeline and a control valve; a liquid outlet of the condensate separator is connected with the spray/frost prevention component of the cold and heat source tower through a pipeline with a second control valve;

the looping system at the cold and heat source side comprises an expansion fluid infusion device, a cold and heat source pump, a first four way reversing valve, and a second four way reversing valve; an inlet of the expansion fluid infusion device and an outlet of the vertical finned heat exchanger of the cold and heat source are connected together through a pipeline; an outlet of the expansion fluid infusion device is connected with the cold and heat source pump through a pipeline; the cold and heat source pump is connected with an inlet of the first four way reversing valve through a pipeline; an outlet of the first four way reversing valve is connected with the inlet of the small temperature difference evaporator at a medium side through a pipeline; another inlet of the first four way reversing valve and a load pump is connected together through a pipeline; an inlet of the second four way reversing valve is connected with a second outlet of the small temperature difference evaporator at the medium side through a pipeline; the second four way reversing valve is connected with an inlet of the vertical finned heat exchanger of the cold and heat source tower through a pipeline; and the circulating system at the terminal load side comprises a terminal heat exchanger, and the first and second four way reversing valve of the looping system at the cold and heat source side; an inlet of the circulating system at the terminal load side is connected with an inlet of the terminal heat exchanger through a pipeline; an outlet of the terminal heat exchanger is connected with a water outlet; the water outlet is connected with the load pump via a pipeline and valve; the load pump is connected with the first four way reversing valve via a pipeline and a valve; the first four way reversing valve is connected with the inlet of the small temperature difference condenser of the low heat source heat pump through a pipeline; a water outlet of the small temperature difference condenser is connected with the second four way reversing valve via a pipeline and a valve; the second four way reversing valve is connected with the inlet of the circulating system at the terminal load side via a pipeline.

2. The heat pump according to claim 1, wherein
the steam fog separator of the cold and heat source tower comprises a diamond-shaped shell, a hydrophilic defog layer, and a diversion baffle;
the diversion baffle is installed in the center of the diamond-shaped shell;
the hydrophilic defog layer is installed in a diamond-shaped region of the diamond-shaped shell; and
the steam fog separator comprises an air inlet at the bottom and an air outlet on the top.

3. The heat pump according to claim 2, wherein
the small temperature difference evaporator of the low heat source heat pump comprises a small temperature difference evaporator body, a front end cover oil chamber, a back end cover oil chamber, an oil evaporation tube, an oil heater, and a negative pressure return oil pipe;
the front end cover oil chamber and the back end cover oil chamber are installed in the front and back end parts of the small temperature difference evaporator body, respectively;
the oil evaporation tube is installed at the inner bottom of the small temperature difference evaporator body;
an oil inlet of the oil heater is connected with the oil evaporation tube;
the oil evaporation tube connects directly with the front end cover oil chamber and the back end cover oil chamber;
an oil outlet of the oil heater is connected with the negative pressure return oil pipe via a pipeline; and
the oil heater is further provided with two heavy oil heating interfaces.

4. The heat pump according to claim 2, wherein
the condensation water separate device used in winter comprises the condensed water film separator and the heat pump heater;
the heat pump heater comprises a heat source fan;
the heat source fan and an air source evaporator are assembled in a cavity;
a steam outlet of the air source evaporator connects with a compressor via a pipeline;
the compressor connects with the small temperature difference heat transfer condenser;
the small temperature difference heat transfer condenser connects with an inlet of an expansion valve;
an outlet of the expansion valve connects with an air source evaporator;
a cycle solution inlet of the small temperature difference heat transfer condenser connects with a multi-media filter of the condensed water film separator;
an outlet of the small temperature difference heat transfer condenser connects with a separator filter of the condensed water film separator;
a solution pressure pump of the condensed water film separator connects with an inlet of the separator filter;
an outlet of the separator filter connects with a water inlet of the small temperature difference heat transfer condenser which connects with an inlet of a multiple media filter;
an outlet of the multiple media filter connects with an inlet of a molecular film processor which is provided with a central drain; and
a strong solution outlet of the molecular film processor connects with the spray/frost prevention component.

5. The heat pump according to claim 1, wherein
the small temperature difference evaporator of the low heat source heat pump comprises a small temperature difference evaporator body, a front end cover oil chamber, a back end cover oil chamber, an oil evaporation tube, an oil heater, and a negative pressure return oil pipe;
the front end cover oil chamber and the back end cover oil chamber are installed in the front and back end parts of the small temperature difference evaporator body, respectively;
the oil evaporation tube is installed at the inner bottom of the small temperature difference evaporator body;
an oil inlet of the oil heater is connected with the oil evaporation tube;
the oil evaporation tube connects directly with the front end cover oil chamber and the back end cover oil chamber;
an oil outlet of the oil heater is connected with the negative pressure return oil pipe via a pipeline; and
the oil heater is further provided with two heavy oil heating interfaces.

6. The heat pump according to claim 1, wherein
the condensation water separate device used in winter comprises the condensed water film separator and the heat pump heater;
the heat pump heater comprises a heat source fan;
the heat source fan and an air source evaporator are assembled in a cavity;
a steam outlet of the air source evaporator connects with a compressor via a pipeline;
the compressor connects with the small temperature difference heat transfer condenser;
a small temperature difference heat transfer condenser connects with an inlet of an expansion valve;
an outlet of the expansion valve connects with the air source evaporator;
a cycle solution inlet of the small temperature difference heat transfer condenser connects with a multi-media filter of the condensed water film separator;
an outlet of the small temperature difference heat transfer condenser connects with a separator filter of the condensed water film separator;
a solution pressure pump of the condensed water film separator connects with an inlet of the separator filter;
an outlet of the separator filter connects with a water inlet of the small temperature difference heat transfer condenser which connects with an inlet of a multiple media filter;
an outlet of the multiple media filter connects with an inlet of a molecular film processor which is provided with a central drain; and
a strong solution outlet of the molecular film processor connects with the spray/frost prevention component.

\* \* \* \* \*